April 1, 1969     E. TRUNGOLD     3,435,724
EXPLOSIVE WASHER FOR HIGH TENSION BOLTS
Filed Jan. 25, 1967
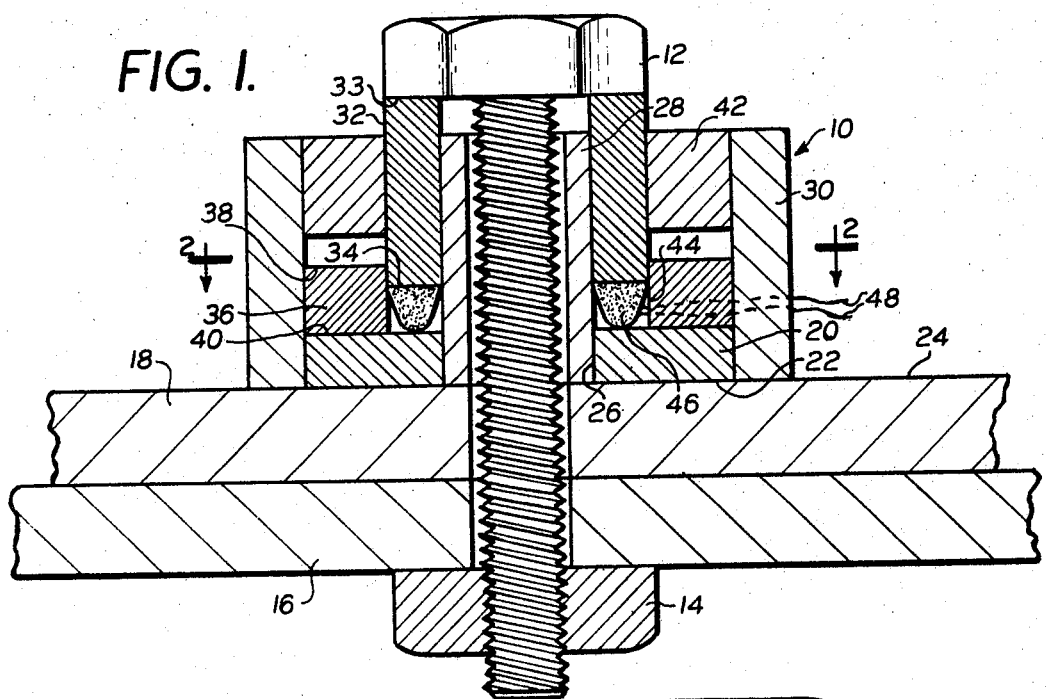
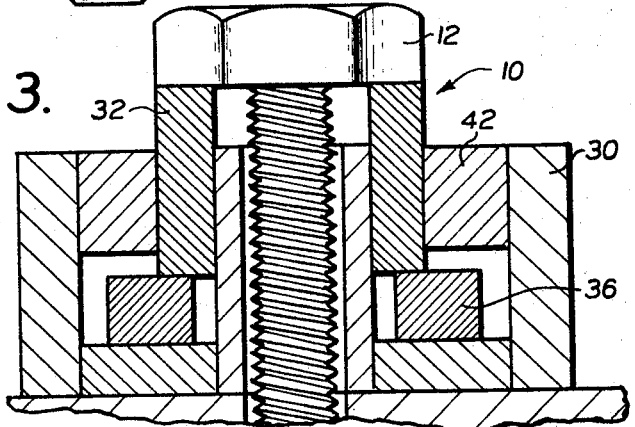
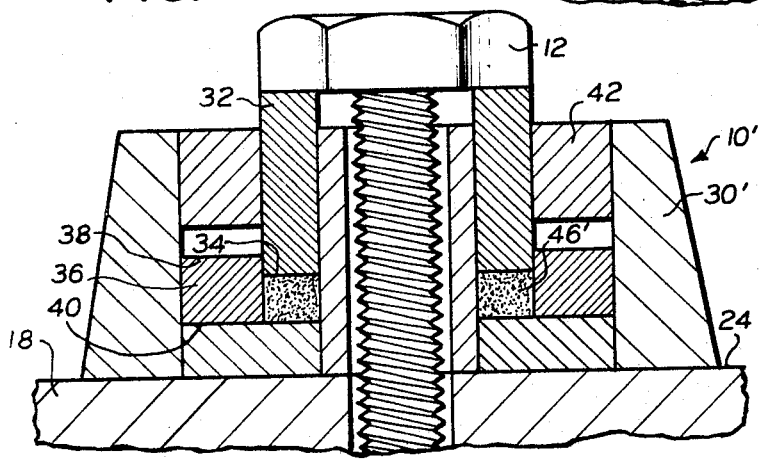
INVENTOR
EMANUEL TRUNGOLD
BY Hubbell, Cohen &
Stiefel
ATTORNEYS.

April 1, 1969 E. TRUNGOLD 3,435,724
EXPLOSIVE WASHER FOR HIGH TENSION BOLTS
Filed Jan. 25, 1967

INVENTOR
EMANUEL TRUNGOLD
BY Hubbell, Cohen &
Stiefel
ATTORNEYS.

United States Patent Office  3,435,724
Patented Apr. 1, 1969

3,435,724
EXPLOSIVE WASHER FOR HIGH TENSION BOLTS
Emanuel Trungold, 6141 Broadway,
Bronx, N.Y. 10471
Filed Jan. 25, 1967, Ser. No. 611,607
Int. Cl. F16b 31/02, 43/00
U.S. Cl. 85—62  11 Claims

ABSTRACT OF THE DISCLOSURE

An explosive washer for tensioning high tension bolts, which washer, when exploded, expands in the axial direction to elongate and therefore stress the bolt.

BACKGROUND OF THE INVENTION

Field of the invention

The present invention relates to an explosive washer for tensioning to a predetermined stress a high tension bolt as used in the steel construction industry.

Description of the prior art

High tension bolts are presently subjected to a predetermined amount of tension by subjecting the nut secured to the bolt to a predetermined amount of torque, it being generally accepted that a given amount of torque will yield a given amount of tension on the bolts. However, this generally accepted proposition is a gross approximation due to the variations in friction between nut and bolt and between nut and the structural members being secured, as well as due to other variables that can be encountered in the field. Accordingly, in present practice, the tension bolts are not subject to a desired amount of tension with any degree of certainty.

Moreover, the present use of pneumatic torquing machines to turn the nuts with a predetermined torque in order to subject the bolts to desired amount of tension requires two to three men and, therefore, is costly.

It should be noted that explosive devices have been employed before in the securing element art. However, they have been employed primarily to effect securement of a securing element such as a rivet, or they have been employed to destroy a nut and bolt as is exemplified by United States Patent No. 3,170,365 granted to R. M. Vaughn on Feb. 23, 1965.

SUMMARY

The present invention relates to the use of a high tension nut and bolt for securing two structural steel elements to one another. A washer embodying the present invention is interposed between either the inner surface of the head of the bolt and the confronting surface of one of the construction elements being connected, or in between the inner surface of the nut and the confronting surface of the other construction element being connected. In either event the washer is constructed the same. Specifically, the washer is provided with two relatively movable bearing surfaces with an explosive charge disposed therebetween. When the explosive charge is detonated as by an electric pulse or heat or the like, the two surfaces will be forced apart whereby to force apart the surfaces sandwiching the washer. Means are incorporated in the washer to prevent the return of the forced apart surfaces to their initial relative positions. Accordingly, the expansion of the washer results in a tensioning of the bolt.

BRIEF DESCRIPTION OF THE DRAWINGS

FIG. 1 is a vertical sectional view of a washer embodying the present invention in position to tension a high tension nut and bolt;

FIG. 3 is a view similar to FIG. 1 showing the washer after detonation;

FIG. 4 is a view similar to FIG. 1 showing a modified embodiment thereof;

DESCRIPTION OF THE PREFERRED EMBODIMENTS

Figure 2:
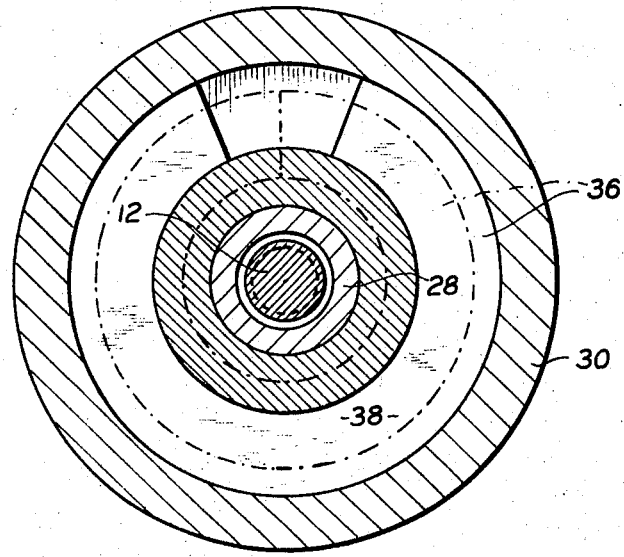
FIG. 2 is a sectional view taken along the line 2—2 of FIG. 1.

Referring now to the drawings in detail, the preferred form of washer embodying the present invention is shown in FIGS. 1 to 3 and is generally designated by the reference numeral 10. Washer 10 is shown in combination with a high tension structural bolt 12 and its companion nut 14 which nut and bolt are shown securing two structural members 16 and 18 to one another. As shown in FIG. 1, the nut and bolt 12 and 14 and washer 10 have been hand tightened or hand wrench tightened. Washer 10 includes an annular shaped disc 20, preferably of steel, having a lower surface 22 adapted to engage the upper surface 24 of the structural member 18. Surface 22 defines one of the bearing surfaces of washer 10. Extending through the center of the annular member 20 is a central aperture 26. Pressed fit into the central aperture 26 of annular disc 20 is an inner sleeve 28 and pressed fit about the outer periphery of annular disc 20 is an outer sleeve 30. The inner and outer sleeves or tubes 28 and 30 and the annular disc 20 among them define a U-shaped annular structure which, in alternative, could be an integral structure although the presently defined construction is projected to be less expensive.

Disposed about inner sleeve 28 in close sliding relationship is a tubular plunger 32 whose lower end 34 terminates above the upper surface of the annular disc 20. Preferably, although not necessarily, the plunger 32 is made of high tensile strength steel. As seen, the upper surface 33 of plunger 32 is the other bearing surface of washer 10. Substantially surrounding the lower portion of the tubular plunger 32 is an arcuate spring blocking member or washer 36, preferably of spring steel, which has its upper surface 38 a preselected distance above the lower surface 34 of plunger 32, and its lower surface 40 preferably resting on the upper surface of disc 20. The spring member 36 as so described is in its flexed or expanded condition and is self-biased toward the inner tube 28. Clearly, the interengagement of plunger 32 and member 36 prevents spring member 36 from contracting toward tube 28. Preferably, the washer 10 also includes a spacer and guide 42 of ring-like construction which bridges the space between the outer sleeve 30 and the tubular plunger 32, is secured to outer tube 30 and is preferably in sliding relation with plunger 32, although it may be spaced therefrom.

It will be noted that the bottom surface of the tubular plunger 32, that is surface 34, and the inner surface of the spring washer 36, together with the upper surface of the annular disc 20 form an annular cavity 44 that is immediately below the plunger 32. Disposed within the annular cavity 44 is an explosive charge 46 which explosive charge as here shown is shaped to direct its explosive force mainly upwardly against the bottom surface 34 of plunger 32. Means for detonating the explosive charge 44 are also included. As shown herein the means are a pair of electrical wires 48 which extend tightly through the outer tube 30, the spring washer 36 to the shaped charge 46 for igniting that charge upon the application of a voltage to the wires 48.

When the shaped charge 46 is detonated by the application of a voltage to wires 48, it will explode and thereby apply an upward force against the bottom surface 34 of tubular plunger 32. This force will be sufficiently great to move the tubular plunger 34 upwardly relative to annular disc 20 against the elasticity of bolt 12. This upward movement of tubular plunger 32 will therefore stress the high tension bolt 12, preferably, although not necessarily, to just above its yield point. Obviously, the movement should not stress the bolt 12 beyond its ultimate stress as this would destroy the bolt. The size of charge 44 is sufficiently great to cause the tubular plunger 32 to move past the upper surface 38 of spring washer 36. The clearing by the plunger lower surface 34 of the upper surface 38 of spring washer 36 will free the spring member and permit it to snap inwardly to the position shown in dotted lines in FIG. 2 and solid lines in FIG. 3. The inward movement of the spring member 36 will prevent a return of the tubular plunger 32 to the position of FIG. 1 notwithstanding the biasing from the resilience of the high tension bolt 12 itself. Thus, the bolt will end up in the condition of FIG. 3 where it has been elongated a precise distance equal to the spacing in FIG. 1 between the surface 34 of tubular plunger 32 and the surface 38 of spring washer 36. This distance has been precalculated to be equal to the strain necessary to yield the desired amount of tensile stress on the bolt 12. Accordingly, the bolt will be precisely tensioned to the exact preselected level of stress. Moreover, the stressing will have been done by one man alone, in a span of about one or two seconds, who has ignited the explosive charge 44 without the use of any expensive torquing equipment that normally requires the attendance of two or three men for a period of time well in excess of ten seconds.

Referring now to FIG. 4, a slightly modified form of explosive washer is illustrated. In the embodiment of FIG. 4 the modified washer 10' is substantially identical in construction to the washer 10 of FIGS. 1 to 3 excepting that the explosive charge 46' is not a shaped charge. Thus, a smaller proportion of the explosive force will be directed upwardly on the lower surface 34 of the tubular plunger 32. Moreover, the loss of directivity of the explosive force might cause undue stressing of the outer cylinder 30'. To overcome this possibility, it will be seen that in FIG. 4 the outer cylinder 30' has a tapered cross section with the heavier portion thereof within the projected area of the explosive charge 46' to make the outer cylinder more resistant to deformation upon the explosion of charge 46'. Apart from these two modifications the structure of washer 10' and its operation are identical to that of washer 10. Accordingly, further detailed description of FIG. 4 is deemed unnecessary.

It will be obvious that while washers 10 and 10' have been described with respect to FIGS. 1 to 4 as being disposed between the head of the bolt 12 and the confronting surface 24 of structural member 18, an identical result can be achieved by disposing such washers between the upper surface of the nut 14 and lower surface of the structural member 16.

Figure 5:
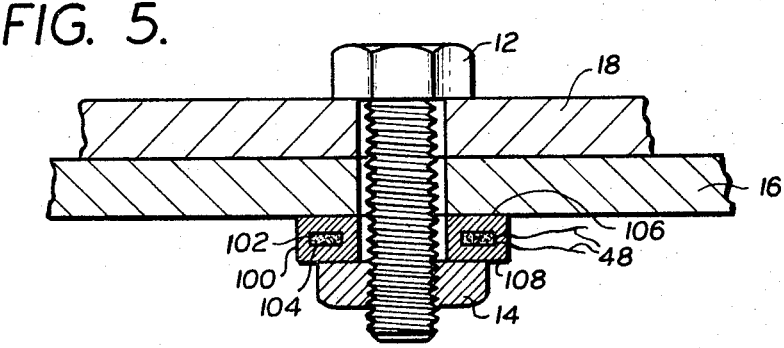
FIG. 5 is a view similar to FIG. 1 showing still another modification of the present invention.
Figure 6:
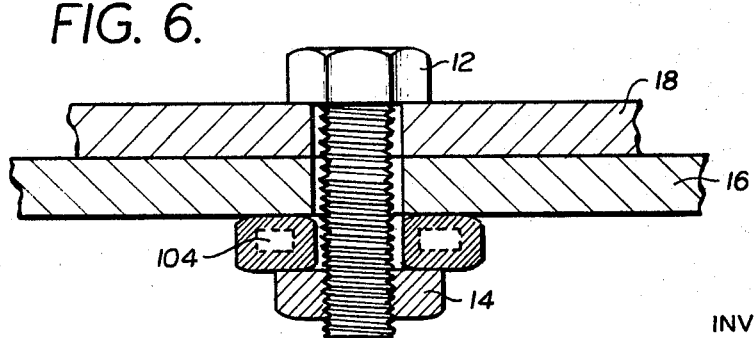
FIG. 6 is a view similar to FIG. 3 with regard to the embodiment of FIG. 5.

Referring now to FIGS. 5 and 6, high tension bolt and nut 12–14 are shown securing two structural members 16 and 18 together with the assistance of an explosive washer 100 of modified form. In the form of washer 100, the washer is essentially a solid annular body, preferably of tough, strong steel, having disposed therewithin in a central cavity 102 an explosive charge 104 which is annular in form. The charge 104 may be shaped to maximize the explosive force in the axial direction. The explosive may be detonatable by any conventional means, here shown to be electrical conductors 48 in the manner of the embodiments of FIGS. 1 through 4.

As noted, the washer 100 is a substantially integral body, although, of course, it may be fabricated from a number of parts as by brazing or welding. However, once constructed it acts like a solid body with an annular hollow core therewith.

In use, a voltage source is applied to the conductors 48 whereby to detonate the explosive charge 104. Upon the charge 104 being exploded, the explosive force will tend to expand the washer in all directions including the direction of its thickness. Thus, washer surfaces 106 and 108 will move away from one another. As the washer expands in thickness it will stress the high tension bolt 12. By controlling the amount of explosive in the charge 104, and by proper selection of materials for forming the washer 100, the washer will be strained beyond its yield point and below its ultimate strength so that it will not elastically return to its original thickness nor will it be broken into pieces. The amount of permanent deformation can be controlled within narrow limits to thereby stress the bolt 12 precisely the amount desired.

It will be noted that in FIGS. 5 and 6 the washer 100 is disposed between the lower surface of the structural member 16 and the upper surface of the nut 14. Of course, the washer could be located between the upper surface 24 of the structural member 18 and the lower surface of the head of the high tension bolt 12 as was true of washers 10 and 10' heretofore described.

It will be obvious to anyone skilled in the art that the device and construction of the present invention need not be incorporated in a washer. For example, if desired, the salient elements of the present invention could be incorporated directly into the head of the bolt 12 or into the nut 14. Thus, for example, if the embodiment of FIGS. 5 and 6 were incorporated into a nut 14, the nut would most likely have to be somewhat thicker than the nuts illustrated in the drawings. Disposed within the thickened nut would be an annular cavity in which an explosive charge would be disposed. Similar incorporation into the head of the bolt is obvious as would be the incorporation of the embodiments of FIGS. 1 through 4 into either the nut or bolt. However, it is presently preferred to embody the invention in a washer as by so doing, standard nuts and bolts as presently constructed may be employed in connection with my novel washer.

While I have herein shown and described the preferred form of the present invention and have suggested modifications therein, other changes and modifications may be made therein within the scope of the appended claims without departing from the spirit and scope of this invention.

What is claimed is:

1. In a combination of a structural member having an aperture therein, a high tension bolt having its head on one side of said structural member and its shank extending through said aperture, a nut threadedly mounted on said bolt on the other side of said structural member; the improvement of means for stressing said bolt comprising:
    (a) first and second surfaces extending transversely of the longitudinal axis of said bolt in predetermined spaced apart relationship;
    (b) one of said surfaces being fixed relative to said structural member and the other of said surfaces being fixed relative to a transverse section of said bolt;
    (c) explosive means for moving said first and second surfaces away from one another; and
    (d) means for preventing said surfaces from returning to said predetermined spaced apart relationship.

2. The means for stressing the bolt as in claim 1, wherein said explosive means includes an explosive charge disposed between said surfaces.

3. The means for stressing the bolt as in claim 2, wherein said explosive charge is shaped to apply more explosive force in the direction of relative movement of said surfaces than in the direction transverse thereto.

4. The means for stressing the bolt as in claim 1, wherein said first and second surfaces are portions of a substantially solid metal body having a cavity therein, said explosive means includes an explosive charge disposed in said cavity, said charge being proportioned to stress said body above its yield point and below its ultimate strength, said means for preventing said surfaces from returning to said predetermined spaced relationship being the permanent set of said body after said explosive charge is detonated.

5. The means for stressing the bolt as in claim 1, wherein one of said two surfaces is the outer surface of an axially movable member having an inner surface, and said means for preventing said surfaces from returning to said predetermined spaced relationship comprising a blocking member for preventing movement of said axially movable member in the direction to move said first and second surfaces toward each other, said blocking member being movable between a blocking and a non-blocking position, means for biasing said blocking member toward said blocking position, means for preventing said blocking member from moving from said non-blocking position to said blocking position when said first and second surfaces are in said predetermined spaced relationship and for permitting said blocking member to move to said blocking position when said first and second surfaces move away from each other and from said predetermined position a predetermined amount.

6. The means for stressing the bolt as in claim 5, wherein said blocking member and biasing means are a self-biased spring member.

7. The means for stressing the bolt as in claim 6, wherein said explosive means comprises an explosive charge, said axially movable member is a tubular plunger having a central passage for receiving the shank of said bolt, said self-biased spring member is arcuate in form and is in engagement with a portion of said tubular plunger when said surfaces are in said predetermined position, the inner surface of said tubular plunger and said arcuate spring member in part defining a cavity in which said explosive charge is disposed, whereby when said explosive charge is detonated, said tubular plunger will move axially away from the other of said surfaces and will become disengaged from said spring member to permit said spring member to slip into the space vacated by said tubular plunger to thereby prevent said plunger from reoccupying said space.

8. An explosive washer for stressing a high tensile strength structural bolt to a predetermined stress level, comprising.
  (a) first and second bearing surfaces in predetermined spaced relationship, said surfaces having aligned apertures therein for passage of a portion of the bolt therethrough, said surfaces being movable away from one another;
  (b) explosive means for moving said bearing surfaces away from one another; and
  (c) means for preventing said surfaces from returning to said predetermined spaced relationship.

9. The explosive washer of claim 8, wherein said first and second surfaces are portions of a substantially solid metal body having a cavity therein, said explosive means includes an explosive charge disposed in said cavity, said charge being proportioned to stress said body above its yield point and below its ultimate strength, said means for preventing said surfaces from returning to said predetermined spaced relationship being the permanent set of said body after said explosive charge is detonated.

10. The explosive washer of claim 8, wherein one of said bearing surfaces is the outer surface of an axially movable tubular plunger having an inner surface, the other of said bearing surfaces is the outer surface of an annular disc having an inner surface which is spaced from the inner surface of said plunger, said means for preventing said bearing surfaces from returning to said predetermined spaced relationship comprises an arcuate spring member having one surface slidably engaging the inner surface of said annular disc and its other surface disposed in a plane between the inner and outer surfaces of said tubular plunger and spaced from the inner surface thereof a distance equal to the strain of the bolt which results from said predetermined stress level, said arcuate spring member being elastically deformed into partially surrounding relation with said tubular plunger, said explosive means comprising an explosive charge, said inner surfaces of said tubular plunger and annular disc and said arcuate spring member defining in part an annular cavity, said explosive charge being disposed within said cavity.

11. The explosive washer of claim 10, further comprising an inner sleeve in register with the central opening of said annular disc in sliding relationship with said tubular plunger, said inner sleeve defining a part of said annular cavity.

References Cited

UNITED STATES PATENTS

| 2,573,880 | 11/1951 | Temple. | |
| 2,575,071 | 11/1951 | Rockwell | 85—1.01 |
| 2,960,902 | 11/1960 | De Caro. | |
| 3,170,365 | 2/1965 | Vaughn | 85—50 |
| 3,230,885 | 1/1966 | Weber et al. | 89—1.01 |

EDWARD C. ALLEN, *Primary Examiner.*

U.S. Cl. X.R.

85—50